(12) United States Patent
Liu et al.

(10) Patent No.: US 8,537,730 B2
(45) Date of Patent: Sep. 17, 2013

(54) METHOD AND APPARATUS FOR SENSING CHANNEL AVAILABILITY IN WIRELESS NETWORKS

(75) Inventors: Hang Liu, Yardley, PA (US); Wen Gao, West Windsor, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 882 days.

(21) Appl. No.: 12/224,537

(22) PCT Filed: Mar. 1, 2006

(86) PCT No.: PCT/US2006/007221
§ 371 (c)(1),
(2), (4) Date: Aug. 28, 2008

(87) PCT Pub. No.: WO2007/100323
PCT Pub. Date: Sep. 7, 2007

(65) Prior Publication Data
US 2010/0092178 A1    Apr. 15, 2010

(51) Int. Cl.
*H04B 7/00*      (2006.01)
(52) U.S. Cl.
USPC ........................................................ 370/310
(58) Field of Classification Search
USPC ............................ 324/326; 395/11; 370/310
See application file for complete search history.

(56) References Cited

U.S. PATENT DOCUMENTS

| | | | |
|---|---|---|---|
| 5,764,061 A * | 6/1998 | Asakawa et al. | 324/326 |
| 6,278,655 B2 * | 8/2001 | Lancaster et al. | 367/124 |
| 6,628,639 B1 | 9/2003 | Ishii | |
| 7,545,308 B2 | 6/2009 | Mitsugi | |
| 2009/0067354 A1 * | 3/2009 | Gao et al. | 370/310 |

FOREIGN PATENT DOCUMENTS

| | | |
|---|---|---|
| EP | 1439725 | 7/2004 |
| JP | 2000-232464 A | 8/2000 |
| JP | 2005-210616 A | 8/2005 |

OTHER PUBLICATIONS

Hu, et al., "IEEE 802.22 Wireless RAN Standard PHY and MAC Proposal," IEEE P802.22 Wireless RANs, Jan. 2006, XP-002404758.
Benko, et al., "A PHY/MAC Proposal for IEEE 802.22 WRAN Systems Part 2: The Cognitive MAC," IEEE 802.22 Wireless RANS, Mar. 2006, XP-002404757.
International Search Report, dated Nov. 13, 2006.

* cited by examiner

*Primary Examiner* — Robert L. Deberadinis
(74) *Attorney, Agent, or Firm* — Robert D. Shedd; Jeffrey M. Navon; Catherine A. Cooper

(57) ABSTRACT

A method and apparatus for sensing channel availability in a wireless network are described including switching to a first candidate channel for operational data transmission and reception sensing a previous operating channel for availability, determining if the previous operating channel is available, switching back to the previous operating channel if the previous operating channel is available and one of continuing to use the candidate channel for operational data transmission and reception and immediately switching to a second candidate channel for operational data transmission and reception and switching to the second candidate channel for operational data transmission and reception after a pre-determined period of time. Also described is a system for sensing channel availability in a cognitive network including an RF unit, for switching channels, a sensing unit for sensing channel availability and a media access control unit for controlling the sensing unit and the RF unit.

29 Claims, 10 Drawing Sheets

METHOD AND APPARATUS FOR SENSING CHANNEL AVAILABILITY IN WIRELESS NETWORKS

This application claims the benefit, under 35 U.S.C. §365 of International Application PCT/US2006/07221, filed Mar. 1, 2006, which was published in accordance with PCT Article 21(2) on Sep. 7, 2007, in English.

FIELD OF THE INVENTION

The present invention relates to cognitive wireless networks and particularly to a method and apparatus for sensing channel availability in a cognitive wireless network, e.g. a wireless regional area network (WRAN).

BACKGROUND OF THE INVENTION

In wireless regional area networks (WRAN), the base station (BS) and associated customer premise equipment (CPE) actively detect the presence of incumbent licensed users or other WRAN systems in the operating frequency band/channel currently being used by the base station and the CPE. If licensed incumbent users are detected, the WRAN needs to switch to another channel to avoid interference with the incumbents. If other WRANs are detected, the WRAN may also switch to another channel to avoid interference between WRANs and allow WRANs to coexist in the spectrum.

A WRAN needs to stop transmitting on the channel it is currently using for operations (transmission/reception), i.e. to become quiet, in order to detect/sense whether an incumbent or another WRAN is also operating on the same channel. This results in service/operation disruption and reduction in WRAN throughput. Furthermore, this procedure introduces delay and the BS/CPE need to buffer the data during the quiet/sensing time.

In some proposals, a quiet time period is scheduled periodically. The WRAN system senses the channel at the quiet time. This approach results in service disruption. The WRAN system cannot transmit data during the quiet time. The data must be buffered at the base stations and CPEs, which introduces delay and higher buffer requirement. Delay may not be tolerable by the real-time traffic such as voice and video applications.

In another proposal, periodic channel hopping was used. In this scheme, the WRAN periodically changes its operating channel. When it hops to a new channel, channel sensing can be performed, on the old operating channel. With this approach, the WRAN operates in a channel for a fixed time before hopping to another channel. If there are multiple WRANs sharing multiple channels, this approach requires a complex scheduling scheme for channel hopping. Otherwise, two or more WRANs may hop to the same channel, which may cause a collision and interference between WRANs for the whole frequency hopping period.

SUMMARY OF THE INVENTION

The present invention is a method and apparatus to sense/detect the channel availability without interrupting the transmission operation of the WRAN. The WRAN first switches to another channel (selected from a list of candidate/backup channels) from its current operating channel (Cop). The WRAN then senses the formerly current operating channel (Cop) while using the candidate channel (Cca) for operation (transmission/reception). If the former current operating channel (Cop) is determined to be available (no incumbent or other WRAN was sensed using the former current channel (Cop)), the WRAN switches back to the former current operating channel (Cop).

The WRAN periodically scans the channels and detects/senses the presence of licensed incumbents and other WRANs. If licensed incumbent users are detected, the WRAN switches to another channel to avoid interfering with the incumbent users. If other WRANs are detected, the WRANs resolve the interference introduced by each other in such a way as to allow fair resource sharing. Thus, the problems solved by the present invention are to perform channel sensing in such a way as to avoid interfering with incumbent users or other WRANs and to simultaneously avoid delays and service disruptions as well as to avoid the necessity for additional buffering.

A method and apparatus for sensing channel availability in a wireless network are described including switching to a first candidate channel for operational data transmission and reception sensing a previous operating channel for availability, determining if the previous operating channel is available, switching back to the previous operating channel if the previous operating channel is available and one of continuing to use the candidate channel for operational data transmission and reception and immediately switching to a second candidate channel for operational data transmission and reception and switching to the second candidate channel for operational data transmission and reception after a pre-determined period of time. Also described is a system for sensing channel availability in a cognitive network including an RF unit, for switching channels, a sensing unit for sensing channel availability and a media access control unit for controlling the sensing unit and the RF unit.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

A cognitive network utilizing the unoccupied digital TV (DTV) spectrum in VHF/UHF band is being developed under the auspices of the IEEE (IEEE 802.22). This network is termed as a wireless regional area network (WRAN) due to its regional coverage. The network cannot cause any harmful interference to the licensed incumbent signals such as DTV signals and wireless microphone signals. In addition, the network needs to support the coexistence of multiple WRANs operating in the same region.

When a WRAN (base station and its associated CPE) senses its current operating channel, it needs to stop transmitting (keep quiet) on this channel in order to detect whether the incumbent or other WRANs operate on this channel. This results in service/operation disruption and reduce the WRAN throughput. During the quiet period, the WRAN system can not transmit data. The data must be buffered at the base stations and CPEs during the quiet period, which introduces delay and increases required buffering. Delays may not be tolerable for real-time traffic, such as voice and video applications.

Figure 1A:
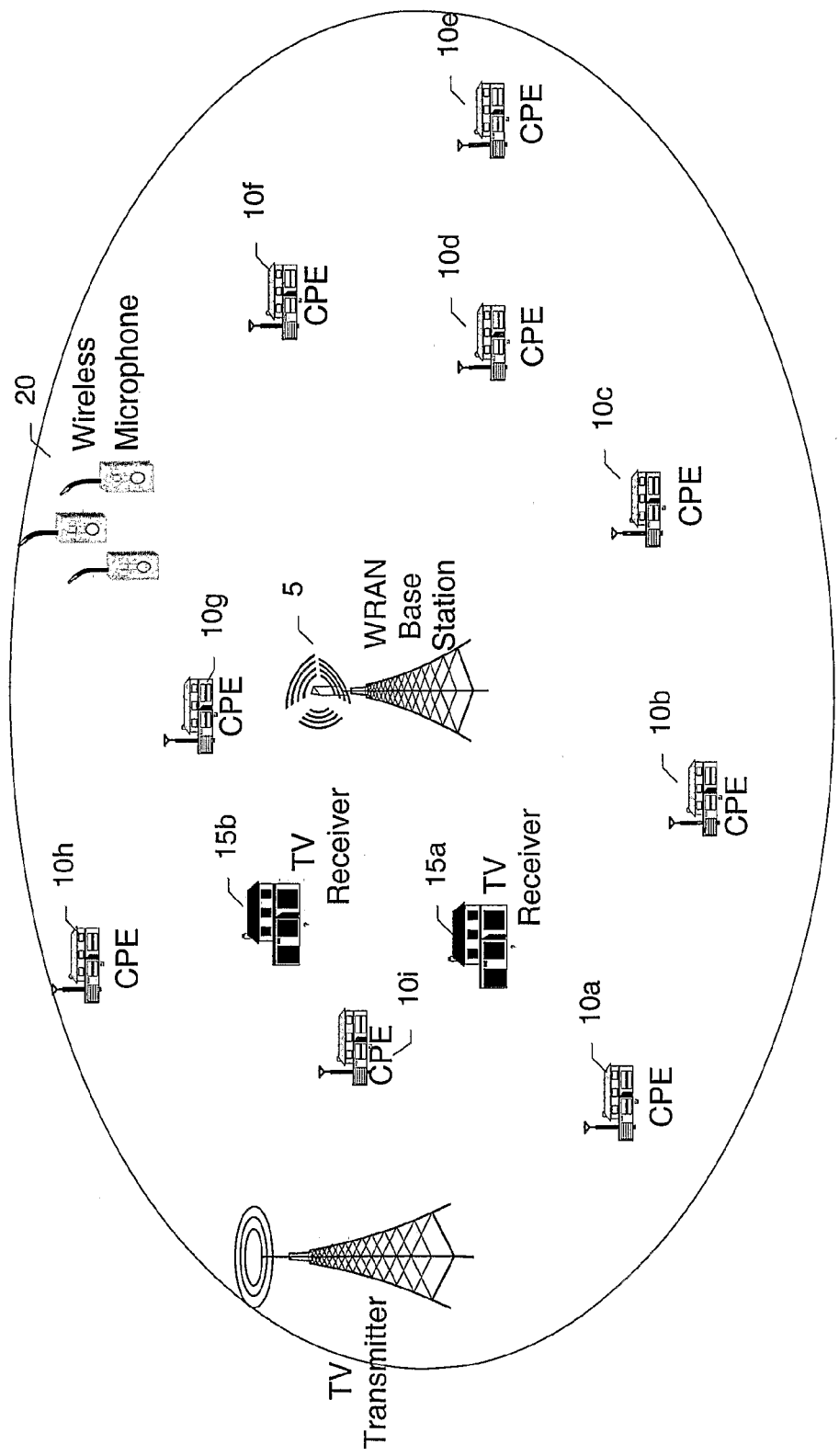
FIG. 1A is a schematic diagram of an exemplary cognitive network (wireless regional area network).
Figure 1B:
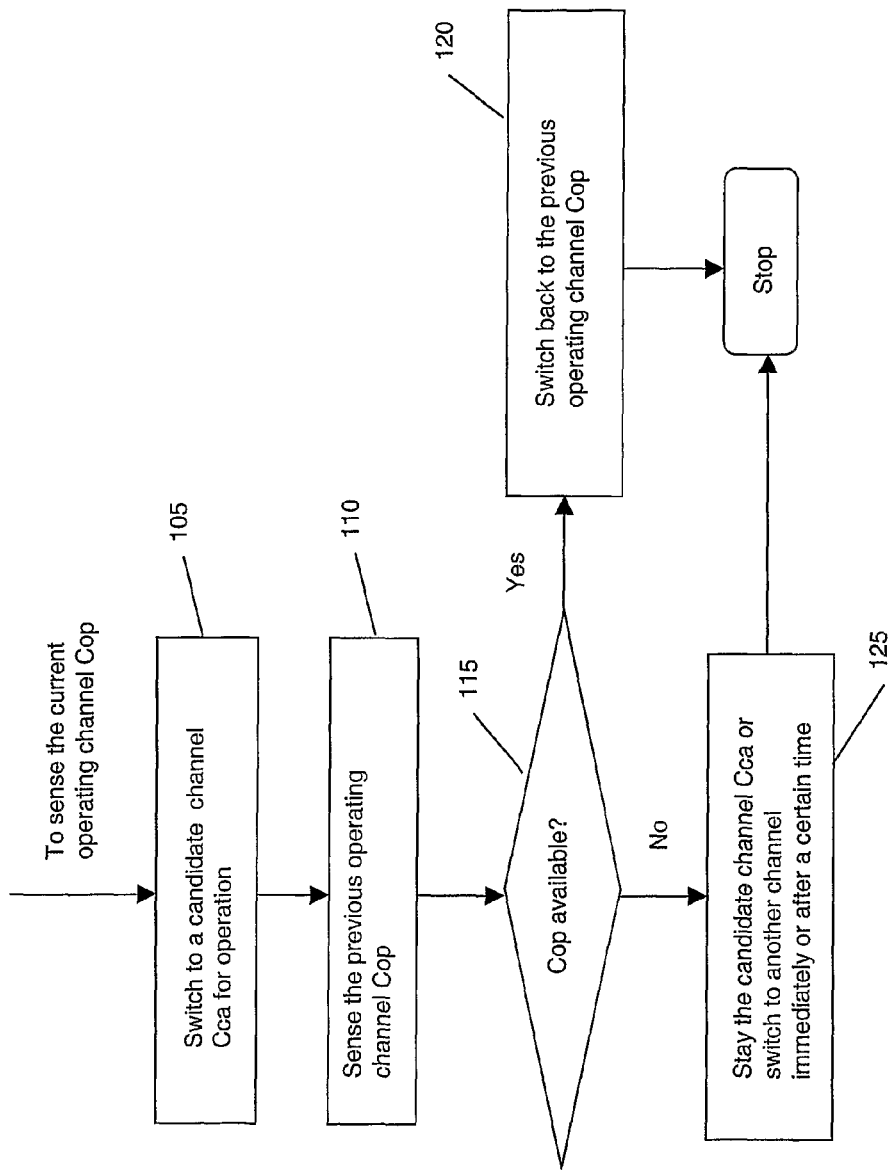
FIG. 1B is a flowchart illustrating the channel sensing procedure in accordance with the principles of the present invention.

The present invention is a method and apparatus to sense/detect channel availability without interrupting the operation (transmission/reception) of the WRAN. The method and apparatus of the present invention are initiated and controlled by a switch and sense control/management message/signal generated and transmitted by a WRAN base station to its associated CPE units. FIG. 1A is a schematic diagram of a wireless regional area network. A WRAN is a fixed point to multipoint network where the WRAN base station 5 communicates with multiple WRAN CPE units 10a-10i. In the coverage area of a WRAN, there may be incumbent users, such as TV receivers 15a, 15b and wireless microphone users 20. There may also be other WRANs (not shown) in the region. As shown in FIG. 1B, the WRAN first switches to another candidate/backup channel (Cca) from its current operating channel (Cop) at 105. The WRAN then senses the previous operating channel (former current operating channel (Cop)) at 110 while using the candidate channel for data transmission/reception. If the previous operating channel (Cop) is determined to be available to operate (no incumbent and other WRANs are using the Cop) at 115, then the WRAN switches back to the previous operating channel (Cop) at 120. If not, the WRAN continues to use the candidate channel (Cca) or in the alternative, switches to another channel immediately or alternatively using the candidate channel for a pre-determined period of time, T at 125.

When a WRAN is operating in a channel, it not only senses the current operating channels but also other channels. Based on the channel sensing results, a backup/candidate channel list, which contains channels free of incumbent users and other WRANs, is generated/built.

Figure 2A:
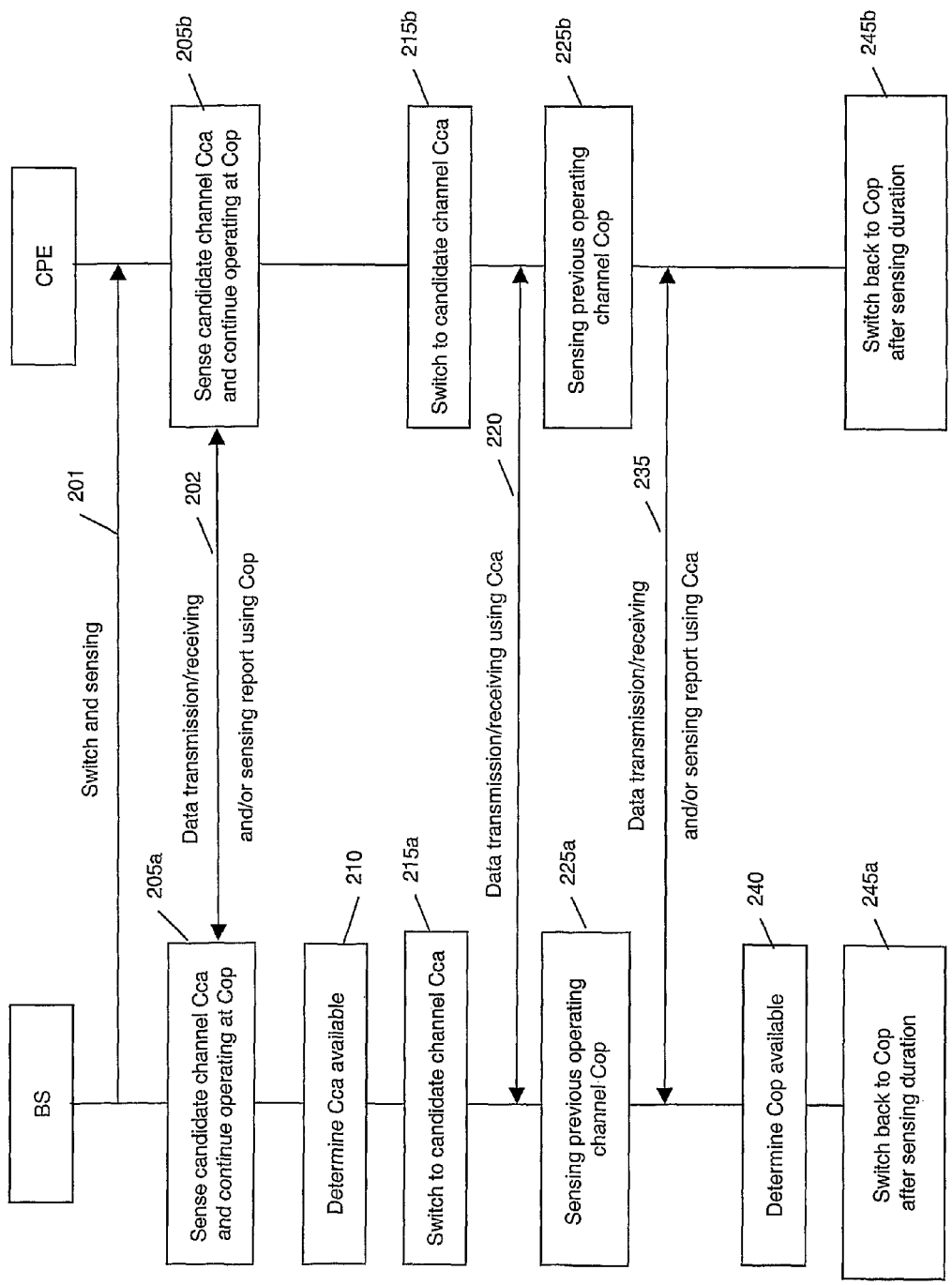
FIG. 2A is a ladder diagram showing the channel sensing procedure and signaling between a base station and customer premises equipment when the candidate channel (Cca) and current operating channel (Cop) are available in accordance with the principles of the present invention.
Figure 2B:
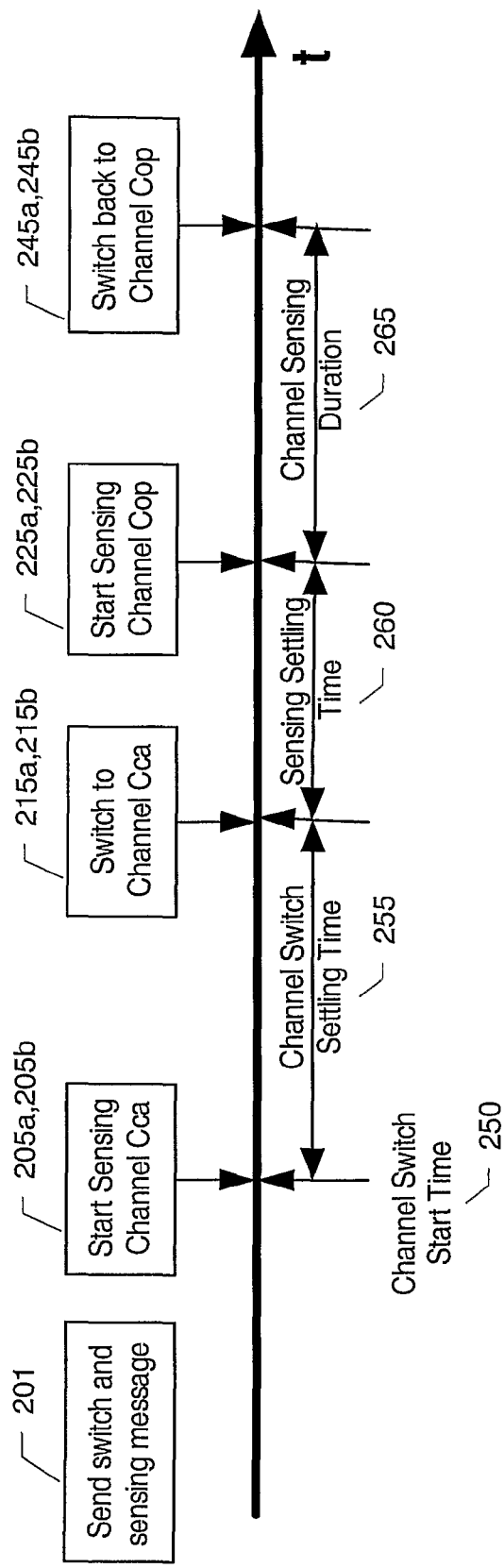
FIG. 2B is a timing diagram of the method shown in FIG. 2A.

FIG. 2A is a ladder diagram showing the channel sensing procedure and signaling between a base station and customer premises equipment when the candidate channel (Cca) and current operating channel (Cop) are available in accordance with the principles of the present invention. FIG. 2B is a timing diagram of the method shown in FIG. 2A. FIG. 2B is a timing diagram showing some of the operations of the ladder diagram and clarifying the timing of the operations.

As shown in FIGS. 2A and 2B, when a base station of a WRAN wants to sense its current operating channel Cop, the base station sends a control/management message/signal (called a switch and sensing control message/signal) to all associated CPE units at 201. The control/management message/signal for each channel sensing period includes the message ID, the channel switch start time, the channel switch settling time, the sensing settling time, the sensing duration, the ID of the candidate operating channel Cca. At the channel switch start time 250, the BS and the CPE units continue operating in the current operating channel Cop at 202. During the channel switch settling time 255, the base station and the CPE units start sensing the candidate operating channel (Cca) at 205a, 205b. If the candidate operating channel Cca is available (no incumbent users or interference are detected during the channel switch settling time 255) at 210, at the channel switch start time 250 plus the channel switch settling time 255, the BS and the CPE units switch to the candidate channel Cca at 215a, 215b. The WRAN then operates (transmits/receives) on the candidate channel Cca at 220. If at the channel switch start time 250 plus the channel switch settling time 255, the WRAN switches to the candidate operating channel Cca, at the channel switch start time 250 plus the channel switch settling time 255 plus the sensing settling time 260, the BS and the CPE units start sensing the previous operating channel Cop during the channel sensing duration 265 at 225a, 225b and the CPE units report the channel sensing results to the BS over the candidate channel Cca along with operational data exchanged between the base station and the CPE units at 235. If the BS determines that the previous operating channel Cop is available at 240, the WRAN switches back to the previous operating channel Cop at the channel switch start time 250 plus the channel switch settling time 255 plus the sensing settling time 260 plus the channel sensing duration period 265 at 245a, 245b.

Figure 3A:
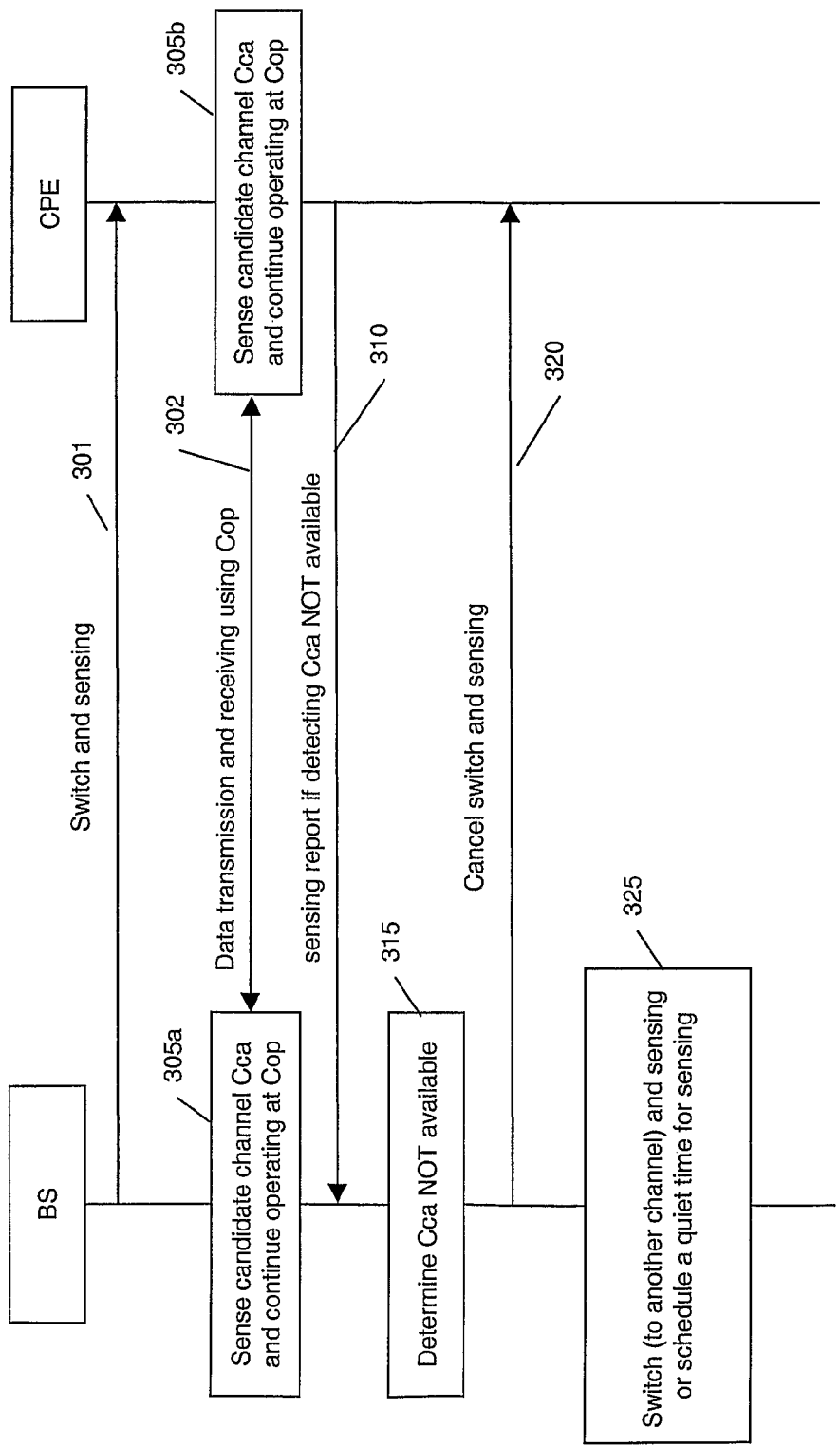
FIG. 3A is a ladder diagram depicting the channel sensing procedure and signaling between a base station and customer premises equipment when the candidate channel (Cca) is not available in accordance with the principles of the present invention.
Figure 3B:
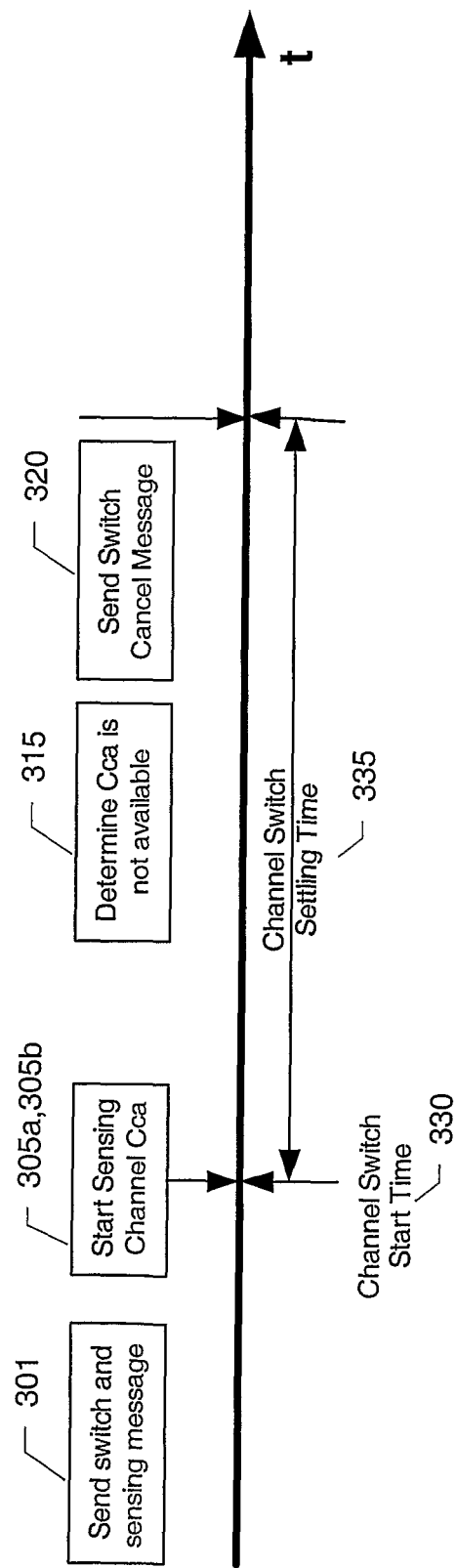
FIG. 3B is a timing diagram of the method shown in FIG. 3A.

FIG. 3A is a ladder diagram depicting the channel sensing procedure and signaling between a base station and customer premises equipment when the candidate channel (Cca) is not available in accordance with the principles of the present invention. FIG. 3B is a timing diagram of the method shown in FIG. 3A. FIG. 3B is a timing diagram showing some of the operations of the ladder diagram and clarifying the timing of the operations.

As shown in FIGS. 3A and 3B, when a base station of a WRAN wants to sense its current operating channel Cop, the base station sends a switch and sensing control message/signal (control/management message/signal) to all associated CPE units at 301. The control/management message for each channel sensing period includes the message ID, the channel switch start time, the channel switch settling time, the sensing settling time, the sensing duration, the ID of the candidate operating channel Cca. At the channel switch start time 330, the BS and the CPE units continue operating in the current operating channel Cop at 302. During the channel switch settling time 335, the base station and the CPE units start sensing the candidate operating channel Cca at 305a, 305b. The BS may detect incumbent users or interference on the candidate channel Cca during the channel switch settling time 335. The CPE may also detect incumbent users or interference on the candidate channel Cca during the channel switch settling time 335. If a CPE detects incumbent users or interference on the candidate channel Cca during the channel switch settling time 335, the CPE reports to the BS at 310. If the BS determines that the candidate channel Cca is unavailable at 315, if possible, the BS cancels the switch and sensing action by sending a control/management message called switch cancel control message/signal to the CPE units on the operating channel Cop at 320. The switch cancel message includes the message ID, the previous control/management message ID (i.e. the ID of the previous switch and sensing message) that this switch cancel message seeks to cancel, and the ID of the channel that the WRAN would switch to (the Cca ID in this case) if this cancel message was not issued. The switch cancel control message/signal cancels the previously transmitted switch and sense control message/signal and any unexecuted steps/actions resulting from the previously transmitted switch and sense control message/signal. If the switch and sensing is canceled, the BS may select another candidate channel to which to switch in order to perform channel sensing on the current operating channel Cop at 325. Alternatively, if the switch and sensing is canceled, the BS may schedule a quiet period for channel sensing, but the WRAN does not switch to another channel during a sensing duration period. In the latter approach, the WRAN cannot transmit data during the quiet period.

Figure 4A:
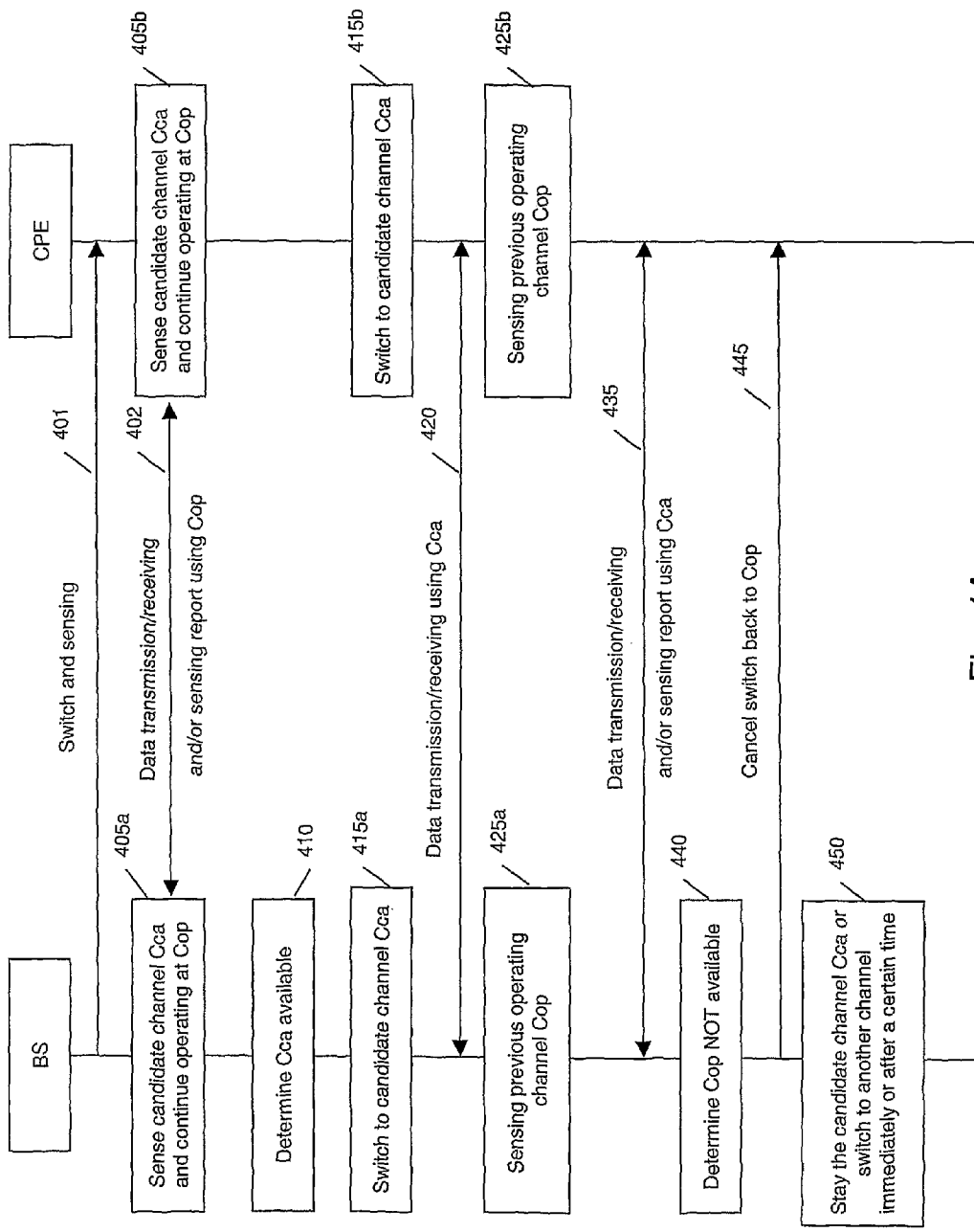
FIG. 4A is a ladder diagram illustrating the channel sensing procedure and signaling between a base station and customer premises equipment when the current operating channel (Cop) becomes unavailable in accordance with the principles of the present invention.
Figure 4B:
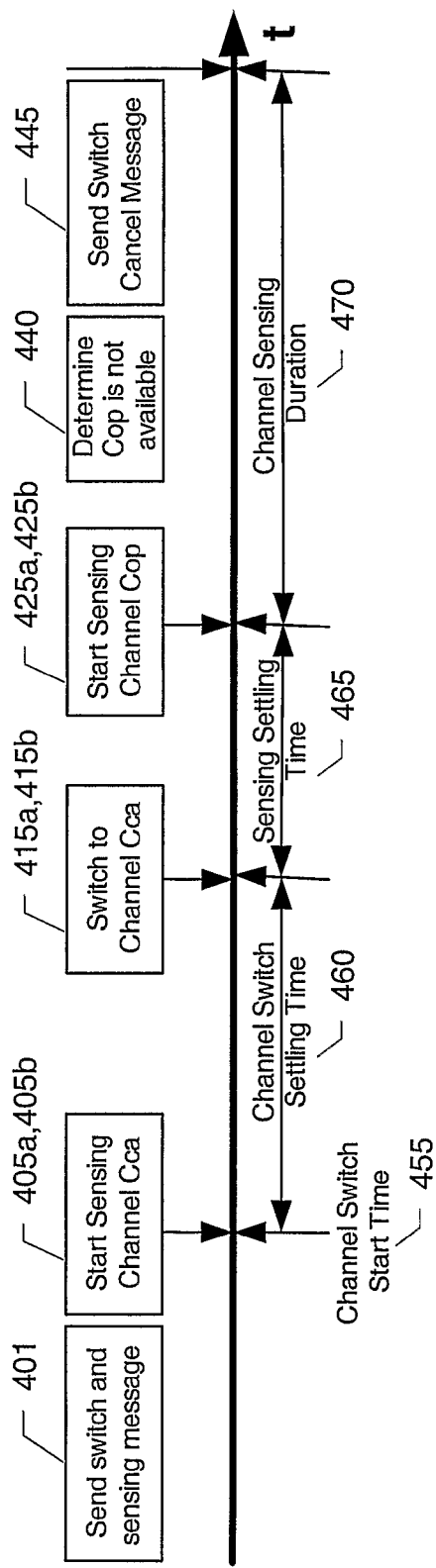
FIG. 4B is a timing diagram of the method shown in FIG. 4A.

FIG. 4A is a ladder diagram illustrating the channel sensing procedure and signaling between a base station and customer premises equipment when the current operating channel (Cop) becomes unavailable in accordance with the principles of the present invention. FIG. 4B is a timing diagram of the method shown in FIG. 4A. FIG. 4B is a timing diagram showing some of the operations of the ladder diagram and clarifying the timing of the operations.

As shown in FIGS. 4A and 4B, when a base station of a WRAN wants to sense its current operating channel Cop, the base station sends a switch and sensing control message/signal (control/management message/signal) to all associated CPE units at 401. The control/management message/signal for each channel sensing period includes the message ID, the channel switch start time 455, the channel switch settling time 460, the sensing settling time 465, the channel sensing duration 470, the ID of the candidate operating channel Cca. At the channel switch start time 455, the BS and the CPE units continue operating in the current operating channel Cop at 402. During the channel switch settling time 460, the base station and CPE unit start sensing the candidate operating channel Cca at 405a, 405b. If the candidate operating channel Cca is available (no incumbent user or interference is detected during the channel switch settling time 460) 410, at the channel switch start time 455 plus the channel switch settling time 460, the BS and the CPE units switch to the candidate operating channel Cca 415a, 415b. The WRAN operates (transmits/receives) on the candidate channel Cca 420. If at the channel switch start time 455 plus the channel switch settling time 460, the WRAN switches to the candidate operating channel Cca, at the channel switch start time 455 plus the channel switch settling time 460 plus the sensing settling time 465, the BS and the CPE units start sensing the previous operating channel Cop 425a, 425b during the channel sensing duration period 470 and the CPE units report the channel sensing results to the BS using the candidate channel Cca along with operational data exchanged between the base station and the CPE units at 435. If the CPE detects incumbent users or interference on the Cop during the channel sensing duration period 470 and thus the previous operating channel Cop is not available at 440, the BS issues a switch cancel message/signal to cancel the channel switch and sense message (control/management message/signal) and switch back to the previous operating channel Cop at 445. The switch cancel message/signal includes the message ID, the previous control/management message ID (i.e. the ID of the previous switch and sensing control message/signal) that this switch cancel message/signal seeks to cancel, and the ID of the channel that the WRAN would switch to (Cop in this case) if this cancel message was not issued. The switch cancel control message/signal cancels the previously transmitted switching back and sense control message/signal and any unexecuted steps/actions resulting from the previously transmitted switching back and sense control message/signal. If the previous operating channel Cop becomes unavailable, the WRAN may continue to operate on the candidate operating channel Cca or in the alternative switch to another channel immediately or alternatively using the candidate for a predetermined period of time, T at 450.

If the WRAN (BS and CPEs) cannot communicate over the candidate channel Cca after switching to Cca, the WRAN (BS and CPEs) sense the previous operating channel Cop for the channel sensing duration period, starting at the channel switch start time plus the channel switch settling time plus the sensing settling time. In this case, the sensing duration is treated as the quiet time. After sensing, the BS and the CPEs may switch back to the Cop or take other actions.

Multiple WRANs, i.e. multiple base stations and their associated CPE units may be synchronized. These WRANs may have a physical or logical control channel among them. In this case, the above switch and sensing method can be performed in a synchronized way. When multiple synchronized WRANs operate in a shared channel/frequency band, they can perform the switch and sense method synchronously, for example, switching away from the shared operating channel simultaneously, to give the shared operating channel a "quiet" time. The channel sensing on the shared operating channel can then be performed and incumbent users (licensed users) will be able to be detected.

In alternative embodiments, it is possible that the channel switch settling time is set to zero or a fixed value. In this scenario, it is possible that the channel switch settling time is not included in the switch and sensing control/management message/signal if the channel switch settling time is set to zero or a fixed value. In yet another alternative embodiment, it is also possible to set the channel switch settling time to a fixed value plus a random value. The random value can be obtained from a window [tw_min, tw_max]. Furthermore, it is possible in yet another alternative embodiment that the sensing settling time is set to zero or a fixed value. In this scenario, it is possible that the sensing settling time is not included in the switch and sensing control/management message/signal if it is set to zero or a fixed value. In yet another alternative embodiment, it is possible that the channel sensing duration period is set to a fixed value. In this scenario, it is possible that the channel sensing duration period is not included in the switch and sensing control/management message/signal if it is set to a fixed value. In another alternative embodiment, the channel switch start time is not included in the switch and sensing control/management message/signal, which means that the channel switch and sensing procedure described above starts immediately after the BS sends the switch and sensing control/management message and the CPE units receive the switch and sensing control/management message.

Figure 5:
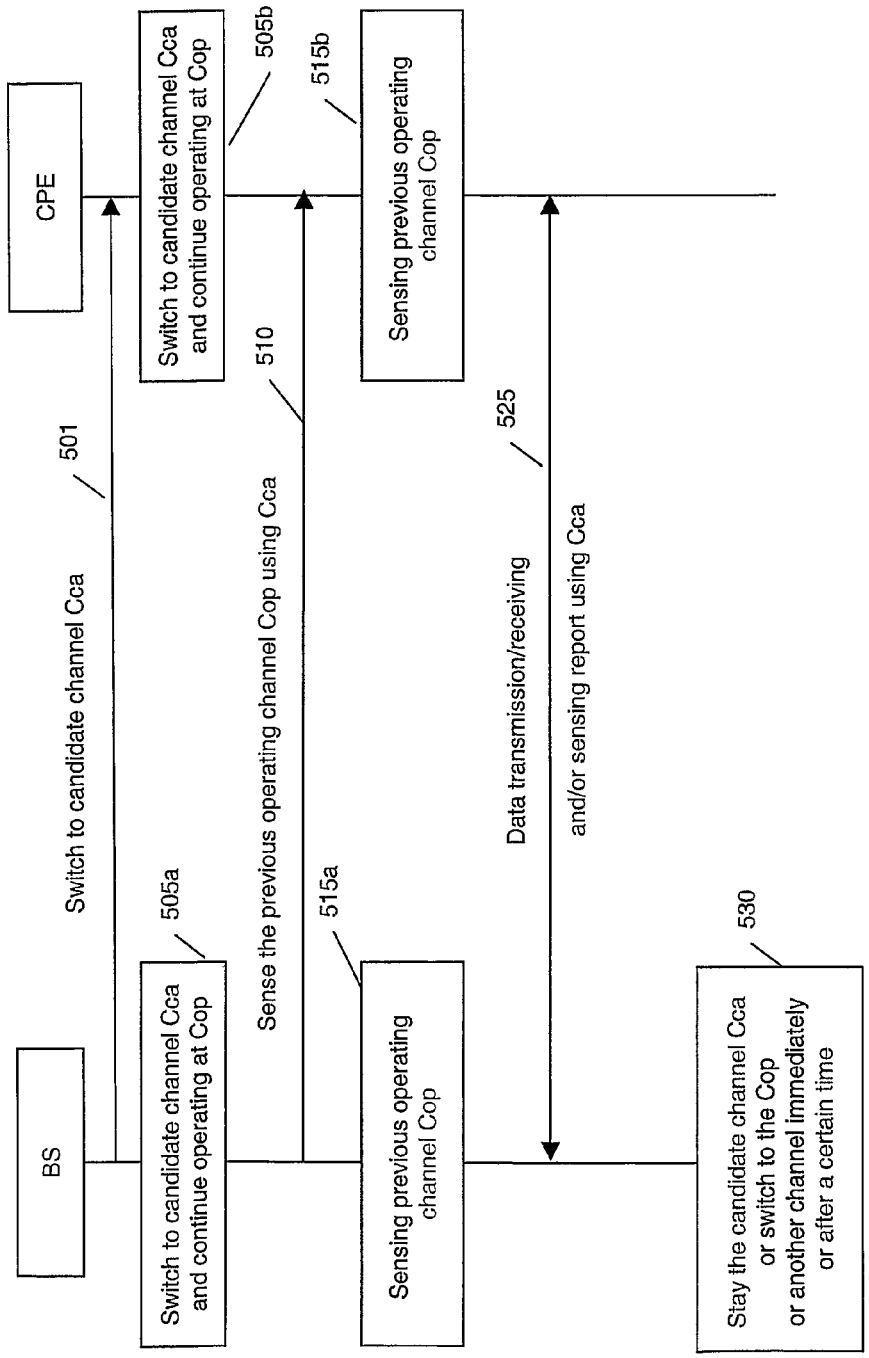
FIG. 5 is a ladder diagram depicting an alternative embodiment for channel sensing and signaling between a base station and customer premises equipment in accordance with the principles of the present invention.

As shown in FIG. 5, another alternative embodiment is that the BS sends a channel switch control/management message/signal to the CPE units at 501 to switch the WRAN to the candidate operating channel at 505a, 505b. When the WRAN operates in the candidate operating channel, the BS senses the previous operating channel Cop at 510 and issues a sensing control/management message/signal to instruct the CPE units to sense the previous operating channel Cop at 515a, 515b.

The CPE units report the channel sensing results to the BS using the candidate operating channel Cca along with operational data exchanged between the base station and the CPE units at 525. Based on the channel sensing results, the BS may determine the WRAN continues operating on the candidate operating channel Cca, or in the alternative switches to the previous operating channel Cop or alternatively switch to another channel immediately or using the candidate for a pre-determined period of time, T at 530. The BS and the CPE units may also scan to locate other candidate operating channels to which to switch.

Figure 6:
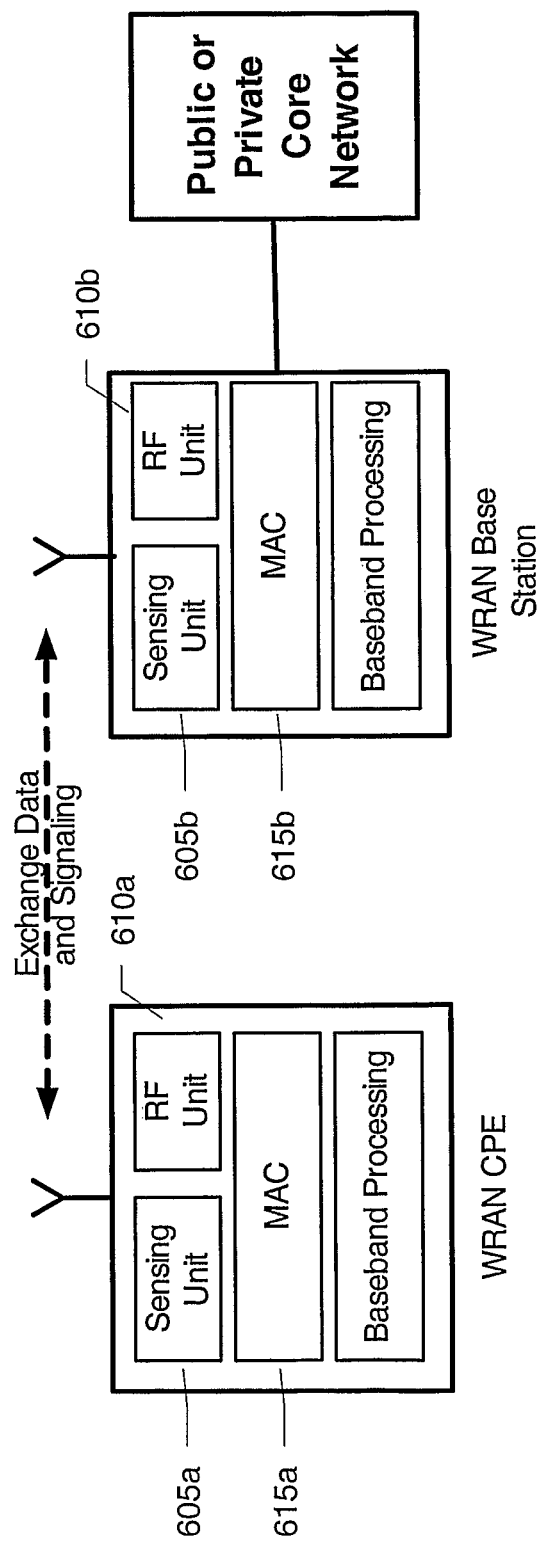
FIG. 6 is a block diagram of a wireless regional area network customer premise equipment and base station in accordance with the present invention.

FIG. 6 is a block diagram of a wireless regional area network customer premise equipment and base station in accordance with the present invention. In both a WRAN base station and WRAN CPE units, there are four major components: sensing unit 605*a*, 605*b*; RF unit 610*a*, 610*b*; media access control (MAC) unit 615*a*, 615*b*; and baseband processing unit 620*a*, 620*b*. The first three of the above-identified components are the subject of the present invention. The MAC unit controls the sensing unit, which senses the channel to determine if there are incumbent users, other WRANs or interference. The MAC unit also controls the RF unit, which actually switches channels in order to perform the channel sensing operations in accordance with the present invention as described above. In a WRAN, the CPE units are under the control of the base station with which they are associated. The control is effected through data and signaling exchanges.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for sensing channel availability in a wireless network, said method comprising:
   switching to a first candidate channel for operational data transmission and reception;
   sensing a previous operating channel for availability;
   determining if said previous operating channel is available;
   switching back to said previous operating channel if said previous operating channel is available; and
   if a current operating channel is unavailable, one of continuing to use said candidate channel for operational data transmission and reception and switching to a second candidate channel for operational data transmission and reception and switching to said second candidate channel for operational data transmission and reception after a period of time.

2. The method according to claim 1, further comprising receiving a channel sensing report for said previous operating channel on said candidate channel.

3. The method according to claim 1, further comprising:
   transmitting a switch and sense control message;
   sensing said first candidate channel for availability; and
   determining if said first candidate channel is available.

4. The method according to claim 3, wherein if said first candidate channel is not available, further comprising:
   transmitting a switch cancel control message;
   selecting a second candidate channel;
   permitting sensing of said previous operational channel by performing one of switching to said second candidate channel for operational data transmission and reception and scheduling a quiet time for sensing said previous operational channel.

5. The method according to claim 3, wherein said sensing of said first candidate channel commences at a channel switch start time and continues through a channel switch settling time period.

6. The method according to claim 4, wherein said transmitting said switch cancel control message during a channel switch settling time period.

7. The method according to claim 4, wherein said switch cancel control message cancels said previously transmitted switch and sense control message and any unexecuted steps resulting from said previously transmitted switch and sense control message.

8. The method according to claim 1, further comprising transmitting a switch cancel control message to cancel switching back to said previous operating channel, if said previous operating channel is not available.

9. The method according to claim 8, wherein said transmitting of said switch cancel control message during a channel sensing duration time period.

10. The method according to claim 8, wherein said switch cancel control message cancels said switching back to said previous operating channel.

11. The method according to claim 1, wherein said switching to said first candidate channel commences at a channel switch start time plus a channel switch settling time period.

12. The method according to claim 1, wherein said sensing of said previous operation channel commences at a channel switch start time plus a channel switch settling time period plus a sensing settling time period and continues through a channel sensing duration time period.

13. The method according to claim 1, wherein said switching back to said previous operation channel commences at a channel switch start time plus a channel switch settling time period plus a sensing settling time period plus a channel sensing duration time period.

14. The method according to claim 1, wherein said continuing to use said candidate channel for operational data transmission and reception commences at a channel switch start time plus a channel switch settling time period plus a sensing settling time period plus a channel sensing duration time period.

15. The method according to claim 1, wherein said switching to a second candidate channel for operational data transmission commences at a channel switch start time plus a channel switch settling time period plus a sensing settling time period plus a channel sensing duration time period.

16. The method according to claim 1, wherein said reception and switching to said second candidate channel for operational data transmission and reception after a period of time commences at a channel switch start time plus a channel switch settling time period plus a sensing settling time period plus a channel sensing duration time period.

17. The method according to claim 1, wherein said steps are initiated and controlled by a switch and sense control message.

18. An apparatus for sensing channel availability in a wireless network, comprising:
- means for switching to a first candidate channel for operational data transmission and reception;
- means for sensing a previous operating channel for availability;
- means for determining if said previous operating channel is available;
- means for switching back to said previous operating channel if said previous operating channel is available; and
- if a current operating channel is unavailable, one of means for continuing to use said candidate channel for operational data transmission and reception and means for switching to a second candidate channel for operational data transmission and reception and means for switching to said second candidate channel for operational data transmission and reception after a period of time.

19. The apparatus according to claim 18, further comprising means for receiving a channel sensing report for said previous operating channel on said candidate channel.

20. The apparatus according to claim 18, further comprising:
- means for transmitting a switch and sense control signal;
- means for sensing said first candidate channel for availability; and
- means for determining if said first candidate channel is available.

21. The apparatus according to claim 20, wherein if said first candidate channel is not available, further comprising:
- means for transmitting a switch cancel control signal;
- means for selecting a second candidate channel;
- means for permitting sensing of said previous operational channel by performing one of switching to said second candidate channel for operational data transmission and reception and scheduling a quiet time for sensing said previous operational channel.

22. The apparatus according to claim 21, wherein said switch cancel control signal cancels said previously transmitted switch and sense control signal and any unexecuted actions resulting from said previously transmitted switch and sense control signal.

23. The system according to claim 20, wherein said cognitive network is a wireless regional area network.

24. The system according to claim 20, wherein said system comprises a base station and associated customer premises equipment units.

25. The apparatus according to claim 18, further comprising means for transmitting a switch cancel control signal to cancel switching back to said previous operating channel control signal, if said previous operating channel is not available.

26. The apparatus according to claim 25, wherein said switch cancel control signal cancels said switching back to said previous operating channel.

27. The system according to claim 25, wherein said base station controls said associated customer premises equipment units.

28. The apparatus according to claim 18, wherein said means are initiated and controlled by a switch and sense control signal.

29. A system for sensing channel availability in a cognitive network, comprising:
- an RF unit, for switching channels;
- a sensing unit for sensing channel availability; and
- a media access control unit for controlling said sensing unit and said RF unit.

* * * * *